(12) United States Patent
Turfan

(10) Patent No.: US 10,986,061 B2
(45) Date of Patent: Apr. 20, 2021

(54) KNOWLEDGE-BASED STRUCTURED COMMUNICATION SYSTEM

(71) Applicant: Ercan Turfan, Istanbul (FR)

(72) Inventor: Ercan Turfan, Istanbul (FR)

( * ) Notice: Subject to any disclaimer, the term of this patent is extended or adjusted under 35 U.S.C. 154(b) by 4 days.

(21) Appl. No.: 16/331,128

(22) PCT Filed: Jan. 16, 2017

(86) PCT No.: PCT/TR2017/050024
§ 371 (c)(1),
(2) Date: Mar. 6, 2019

(87) PCT Pub. No.: WO2018/132080
PCT Pub. Date: Jul. 19, 2018

(65) Prior Publication Data
US 2019/0230058 A1  Jul. 25, 2019

(51) Int. Cl.
*H04L 12/58* (2006.01)
*H04L 29/08* (2006.01)
*G06F 40/58* (2020.01)

(52) U.S. Cl.
CPC .............. *H04L 51/26* (2013.01); *H04L 51/36* (2013.01); *H04L 67/18* (2013.01); *H04L 67/2804* (2013.01); *G06F 40/58* (2020.01)

(58) Field of Classification Search
CPC ......... H04L 51/26; H04L 51/36; H04L 67/18; H04L 67/2804; G06F 40/58
USPC ........................................................ 709/207
See application file for complete search history.

(56) References Cited

U.S. PATENT DOCUMENTS

| 10,102,755 | B1 * | 10/2018 | Hamilton | G08G 5/0013 |
| 2005/0038687 | A1 * | 2/2005 | Galdes | G06Q 10/107 |
| | | | | 709/206 |
| 2007/0016614 | A1 * | 1/2007 | Novy | G06F 40/20 |
| 2009/0063470 | A1 * | 3/2009 | Peled | G06F 40/295 |
| 2013/0006610 | A1 * | 1/2013 | Quadracci | G06F 40/117 |
| | | | | 704/9 |
| 2017/0011615 | A1 * | 1/2017 | Bekanich | G08B 25/006 |

FOREIGN PATENT DOCUMENTS

EP     1190339 B1     7/2005

OTHER PUBLICATIONS

International search report and written opinion, dated Sep. 18, 2017, of International Application No. PCT/TR2017/050024; 11 pgs.

* cited by examiner

*Primary Examiner* — Tauqir Hussain
(74) *Attorney, Agent, or Firm* — Kilpatrick Townsend & Stockton LLP

(57) ABSTRACT

Invention relates to, a communication system for a communication network comprising a first communication device configured to generate a structured electronic message with an identification part, an address part and an information part; an interpretation system located at a knowledge operator comprising a receiving unit in data communication with the first communication device reading sender and receiver address from the address part of the structured electronic message.

13 Claims, 1 Drawing Sheet

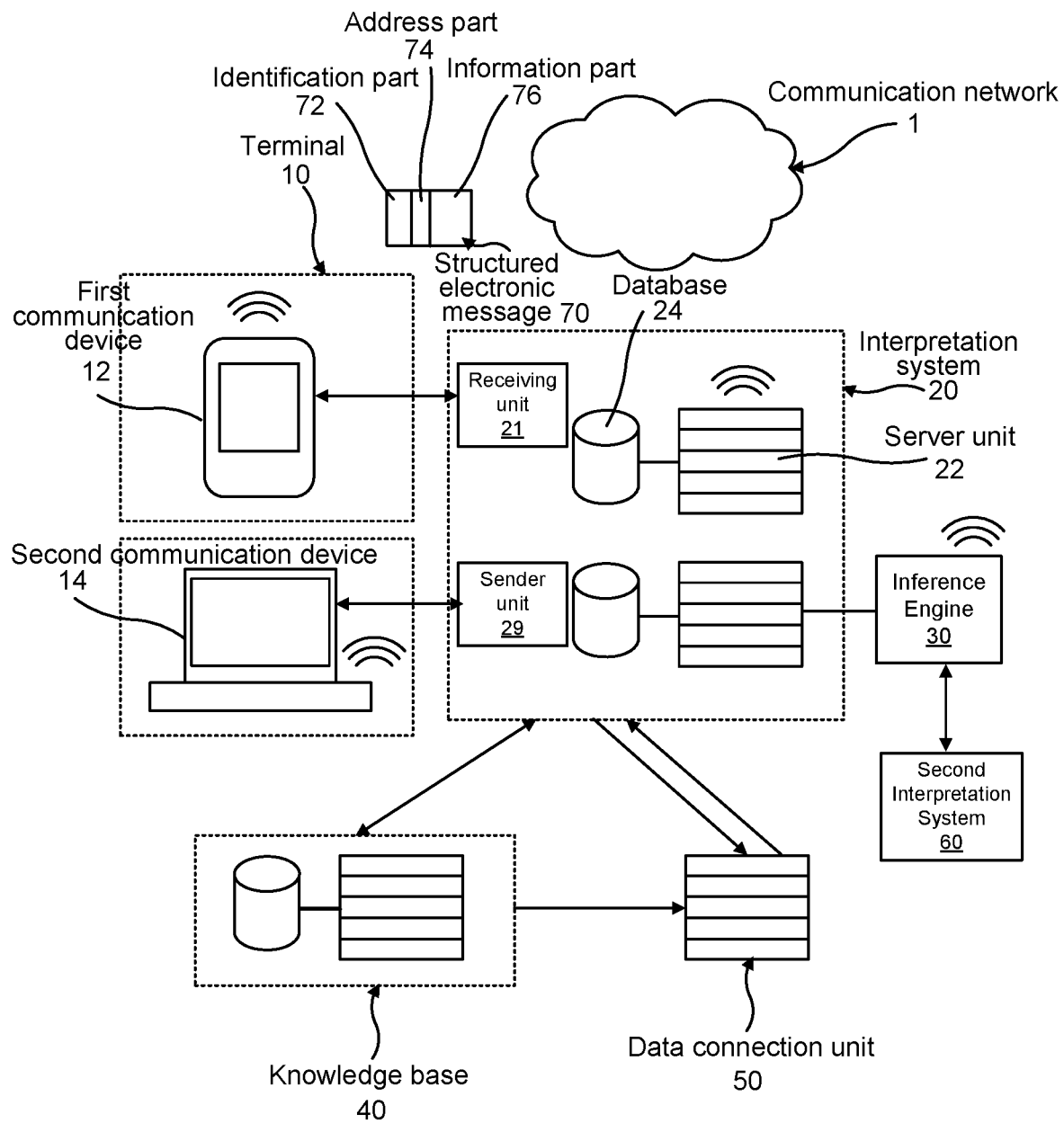

KNOWLEDGE-BASED STRUCTURED COMMUNICATION SYSTEM

RELATED APPLICATIONS

This application is a U.S. National Phase of International Application No. PCT/TR2017/050024, filed Jan. 16, 2017, the entire disclosure of which is incorporated by reference herein.

TECHNICAL FIELD

Invention pertains to the knowledge-based communication and structured communication system, particularly a data interpretation system using inference engine

PRIOR ART

Today, individuals use communication for their personal use and for their roles in different communities, i.e. companies, non-profit organizations, military forces, social communities, groups, political parties etc.

The communication is always made as a part of a process or as standalone one.

Unstructured text data is transmitted among them as sender(s) and recipient(s) as emails, fax, SMS or instant messaging. Unstructured voice is transmitted in a phone or voice-over-IP conversation.

Without help of an additional structuring tool, the transmitted message at all consist of one free message body, i.e. free text or free voice. Internet has been used as a platform for these communications such as IP (VoIP) calls, video-conferencing, text and instant messaging, emails, fax and the like.

In addition, direct messaging within social media applications are used. There is unified communication that collects all voice, text and video messages at a centralized place for an individual.

EP1190339 discloses a computer-readable system and method for interpreting and selectively forwarding an interpreted message derived from a user's received electronic message, such as an e-mail, fax, converted voice and pager messages, to a mobile communications device of the user. A structured knowledge base comprises knowledge objects of user-related information and the knowledge objects are interlinked by semantic links to permit dynamic navigation thereof. Navigating means dynamically navigates through the structured knowledge base using the content of the received message and determines key term(s) relating to the content as a result of the navigating. An interpreted message is determined from those key term(s). Prioritizing means determines the priority of the message, selects the second communications device based on the current context of the user and the content of the message in relation to the user-related information and assigns priority indicia to the interpreted message according thereto.

BRIEF DESCRIPTION OF THE INVENTION

Object of the invention is providing a communication system transmit structured personalized information using plurality of knowledge sources among individuals and institutions recognizing their multi-identifiers by using an expert system.

In order to achieve above objective, invention is a communication system for a communication network comprising a first communication device configured to provide a structured electronic message with an identification part, an address part and an information part; an interpretation system located at a knowledge operator comprising a receiving unit in data communication with the first communication device reading sender and receiver address from the address part of the structured electronic message. According to the invention the interpretation system is comprising a data connection unit configured to establish a data communication with a knowledge-base recognizing multiple identifiers of the sender and receiver from the address part provided by the receiving unit and an inference engine connected to the knowledge-base which generate inferenced data based on the multiple identifiers configured to generate additional information to be associated with the information part of the structured electronic message by means of matching stored data or fetching relevant information from another data resource and a sender unit providing modified structured electronic message to one or more second communication device in accordance with the sender information in the address part. Invention provide a two way knowledge based communication system and method for the intelligent and secure communication among individuals, institutions, government, associations, groups, digital and analog data sources with their roles by help of the knowledge operator and the knowledge base connecting all the universal information at these sources; a structured, easy readable and processable, secure, multilingual messages; an inference engine and software at all kind of devices and things in the mobile, internet and physical world. Multiple identifier of the structured electronic message allows interpretation unit to assign relevant role of the sender and allow knowledge base to provide only relevant information for the one or more identifier provided by the structured electronic message. Therefore, individuals can be recognized with their role whether personal or in an institution i.e. an individual login the system with its role as in real life to indicate that it is an institution based communication.

In a preferred application, the data connection unit is configured to establish a data communication with a second interpretation system using the sender unit to transmit the structured electronic message. In this case, second interpretation system can provide modified structured electronic message back to the first interpretation system to deliver second communication device or directly deliver the modified information to the second communication device itself.

In a preferred application, the data connection unit is configured to receive a second structured electronic message having the information part with inferenced information from the second interpretation system. Such a communication provides a receiver a structured knowledge for a decision making or other reasons i.e. intelligent knowledge delivery and fusion by using the sender and the receiver identity information; the senders structured data transmitted at the message; geo location; time information through different knowledge sources. In case of a fusion of two structured electronic message, whole structured electronic message may be contained by the information part or only a unique identifier of a structured electronic message may be contained by the information by the other structured electronic message, so called the mother message. In a preferred application, first communication device is configured to read modified structured electronic message. In case of the structured electronic message include a unique identifier of another relevant structured electronic message, first communication device can access content of the information as a whole, i.e. all assigned structured electronic messages together such as mother and the child messages.

In a preferred application, the interpretation system is configured to convert the structured electronic message into the information part of another structured electronic message. This will allow merge of two structured electronic messages with corresponding parts and transmit complete information required to the second communication device at once.

In a preferred application, the knowledge-base is configured to access multiple knowledge resources using data connection. The digital data stores and analog data stores in data communication with the knowledge-base can be accessed by using plurality of devices, things and the first and second communication devices owned by individuals or institutions. Parties may also join the communication as a knowledge source or a consumer by providing manual data by their own mind with their role as a manual knowledge source or pre-prepared data owned by them staying at a digital data store as an electronic knowledge source or like a document owned by them staying as analog data store. Some of the data stores are e.g. databases, e-mail servers, SaaS platforms, any kind of data storage media etc. and some others of the analog data stores are documents, old analog media storage systems.

In a preferred application, the interpretation system is configured to add network address of the knowledge-base to the address part of the structured electronic message. To avoid transmit big chunk of data inside the container of the information part, a link to the knowledge-base address can be included to the modified structured electronic message to access the relevant information via second communication device.

In a preferred application, the interpretation system is adapted to create a unique identifier for each one of the structured electronic messages and modify the address part to include the unique identifier of the structured electronic message.

In a preferred application, the interpretation system is adapted to link one of more structured electronic message to each other by adding the unique identifier information into the information part. Easy combination of different structured electronic messages only by transmitting unique identifier, e.g. in alfa numerical format, will be possible by including different relevant unique identifiers into the address part of the structured electronic message.

In a preferred application, the interpretation system is configured to modify the structured electronic message such that the information part contains one or more additional structured electronic message. Merging information part of the relevant structured electronic messages provide second communication unit to access information as a package without a second need to access the network.

In a preferred application, the data connection unit is configured to receive information from the second communication device and transfer information to the knowledge-base. This provide two-way data communication between the knowledge base and the receiver having the second communication device.

In a preferred application, the first communication device is adapted to display the structured electronic message in visually accessible manner. Such a device can be a mobile device with a display unit.

In a preferred application, the first communication device is configured to provide a list of predefined messages for being selected as the structured electronic message. Precise understanding of the message is ensured by predefined list of the messages which will be converted into an inferenced information by the interpretation unit using multiple identifier of the sender via first communication unit.

Although individuals have more than one unique identity identifiers like email addresses; mobile telephone numbers, national Ids, tax numbers, username for a software, credit card number, tags (NFC, RFID, QR) etc. in real life, an individual may not be recognized by these plurality of identifiers but only limited identifiers like one mobile phone number and email addresses; although devices, systems or things can also represent an individual or an institution like a software of a hospital, a coffee machine of a company, a brand/word of an individual or an institution etc., there are no identifiers intelligently carrying their owners id; individuals (senders or receivers) cannot be recognized with their role whether personal or in an institution i.e. an individual do not login he system with his/her role as in real life to indicate that it is an institution based communication (person to institution, institution to institution or person to person).

DESCRIPTION OF THE FIGURES

FIG. 1 is a schematic view of an exemplary embodiment of the communication system per the invention.

REFERENCE NUMBERS

1 Communication network
10 Terminal
12 First communication device
14 Second communication device
20 Interpretation system
21 Receiving unit
22 Server unit
24 Database
26 Electronic control unit
29 Sender unit
30 Inference engine
40 Knowledge base
50 Data connection unit
60 Second interpretation system
70 Structured electronic message
72 Identification part
74 Address part
76 Information part

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In FIG. 1, a communication system for a communication network (1) is schematically shown. A terminal (10) having a wireless connection capability establish a data communication inside the communication network (1). Terminal (10) is comprising a first communication device (12) as a sender and a second communication device (14) as a receiver for a structured electronic message (70). The first communication device (12) is a mobile device having a display enabling a first user to write, select, modify and send an information in text, image, video format or combination thereof. The communication system is having an interpretation system (20)

with a two-way data access to the communication network (1). Interpretation system (20) comprises a receiving unit (21) to monitor and read electronic signals, i.e. data from connected devices accessible to the communication network (1). Plurality of server units (22) are arranged at the interpretation system (20) equipped with an electronic control unit (26), i.e. CPU and managing a database (24). The interpretation system (20) is associated with a sender unit (29) accessible to the communication network (1). Sender unit (29) and receiving unit (21) is combined in the same device such as a router or the like providing high speed data connection between the communication network (1) and the interpretation system (20). A data connection unit (50) is configured to provide data transmission between the server unit (22) and an inference engine (30) and a knowledge base (40). Inference engine (30) is also in data connection with the knowledge base (40). A second interpretation system (20) is also accessible by the interpretation system (20) via communication network (1).

The second communication device (14) is a computer having a display to show the structured electronic message (70) provided by the interpretation system (20) transmitted via communication network (1).

A structured electronic message (70) provided by the first communication device (10) is shown with the transmitting environment. The structured electronic message (70) comprises three main parts, namely an identification part (72), an address part (74) and an information part (76). The identification part (72) allow interpretation system (20) to recognize multiple identifiers of the sender and include various identifiers for a person or institution such as e-mail address, phone number, national identification number, 2d/3d barcode, geocode, device number, internet protocol number, software identification number, tax number, NFC, RFID tag information or others. Additionally, the identification part (72) also comprises receiver's multiple identifiers. The interpretation system (20) detects real life identity of the sender from the structured electronic message (70) to find a unique identifier of the sender inside the database (24) matching with the sender. The identification part (72) include a unique identifier with two parts, wherein the first part is the type to understand if the structured electronic message (70) is from a sender, to a sender, the message itself or the information on the structured electronic message (70). The second part is the number part that will cover all the universal items like 24 digits. The identification part (72) also include information on the type of the sender whether individual, institution, association & club, government, group or data store; role of the sender if acting for himself or for others if the sender type is individual; the identification information if the sender is individual or a data store; identity of the structured electronic message (70).

There are different types of sending the structured electronic message (70) such as manual, automatic, scheduled and self-service messaging. At the manual messaging the sender can transmit the structured electronic message (70) via the first communication device (12) manually as a native message or a message via e-mail, SMS or a social media message.

Each structured electronic message (70) unless it is not a mother message, is assigned as the mother by default. The terminal (10) is able to identify a main message if it was assigned as the mother. The structural electronic message (70) is a child if it was created by a mother message or a process by the interpretation system (20).

The information part (76) of the structural electronic message (70) has plurality of forms that are created based on existypes. A user can create personalized structured electronic message (70) under an existype or create information or messages under personalized form. The existypes selected for the embodiment of the invention are identities, such as living identities, institutional identities, abstract identities; objects, such as physical objects, soft objects; events; properties; propositions; minds; time and location.

A privilege for each one of the structured electronic messages (70) is made by the message source such as the terminal (10) or interpretation system (20). The structured electronic message (70) can be opened to the public or dedicated use of an individual, institution, government body, association/club or a group or a plurality of terminals (10).

Specific terminals (10) or interpretation system (20) access may be limited by the creator of the structured electronic message (70).

Any sender within the privilege can utilize from mass customization of the information part (76) of the message served by any data source. The information part (76) arranged so that the communication is accomplished within a predefined structure. For manual messaging, sender may select a personalized information part (76) and transmit the structured electronic message (70) as an instance from this information part (76). An example use of the system is for the military purposes. Sender may only select one of the information part (74) that are privileged to him. The information part (74) can carry data with the below information types: text, image, video, voice/music, number, date, time, geocode, the identification part of another message.

According to the example use of the invention a health unit call may be a predefined information part (76) under existype "event" to be used in a military force. The structured message (70) as listed under heath section as "call medical unit" is selected by the sender from the display of the first communication device (12) and sent to the interpretation system (20). The communication network (1) is a military network with restricted access to the owners of the terminals (10). The receiving unit (21) read the structured electronic message (70) with an identification part (72), address part (74) and an information part (76). The receiving unit (21) is having a firewall to control access privileges of the sender to the interpretation system (20) at the knowledge operator. If authorization is approved receiving unit (21) transmit the data to the interpretation unit (20).

The interpretation unit (20) retrieve multi identifiers of the sender by means of a query at the database (24) of a server unit (22). The interpretation unit (20) process the structured electronic message (70) to match corresponding information at the knowledge base (40) by means of a data connection between the server unit (22) and the knowledge base (40) over data connection unit (50). Predefined information part (76) require interpretation unit (20) to provide penicillin allergy information for the sender and establish a data connection with the knowledge base (40) to find relevant information for the sender. The knowledge base (40) is a data center of the military hospital holding vital information of the military personnel.

The interpretation system (20) modify the information part (76) based on collected information from the knowledge base (40). The interpretation system (20) forward the modified structured electronic message (70) to the second communication device (14) via the sender unit (29).

An operator monitoring emergency health messages receive the modified structured electronic message (70) at the display of the second communication device (14). The second communication device (14) display the information part (76) including the name, gps coordinates and penicillin allergy information at the screen and dispatch a medical unit according to the provided information. The receiver may also be selected through the geocode or any other rule that can be processed by the inference engine (30). The information part (74) modified by collecting various information from the knowledge base (40). The information at the knowledge base can be static or dynamic, e.g. change by time. Knowledge base own the original information, copy of an information for a valid time or show the information's owner and address.

The invention claimed is:

1. A communication system for a communication network comprising:
- a terminal comprising:
  - a first communication device as a sender of knowledge configured to send knowledge as a structured electronic message consisting of an information part, an identification part and an address part,
    - wherein the information part is personalized as an instance of a specific form among a plurality of pre-defined forms,
    - wherein the identification part carries a unique identity of the structured electronic message and identifies a type of the structured electronic message and a role of the sender and a receiver, and
    - wherein the address part identifies a sender address and a receiver address with multiple identifiers, and
  - a second communication device as the receiver for the structured electronic message;
- a data connection unit configured to establish a data communication with a knowledge-base and a database;
- an interpretation system configured to receive and interpret the structured electronic message by fetching and collecting information via the data connection unit that provides data transmission among one or more server units, the database and the knowledge-base, the interpretation system comprising:
  - a receiving unit in data communication with the first communication device, the receiving unit configured to:
    - receive the structured electronic message, and
    - read the structured electronic message,
  - wherein the interpretation system is configured to:
    - retrieve additional information from the knowledge-base based on a content of one or more parts of the structured electronic message read by the receiving unit;
    - generate inferenced data using information retrieved from the information part of the structured electronic message, and
    - generate a modified structured electronic message based on the inferenced data and the additional information retrieved from the knowledge-base, wherein the modified structured electronic message includes the additional information and the inferenced data in the information part of the modified structured electronic message, and
  - a sender unit providing the modified structured electronic message to the second communication device in accordance with the sender address in the address part.

2. The communication system according to claim 1, wherein the data connection unit is configured to establish a data communication with a second interpretation system using the sender unit to transmit the structured electronic message.

3. The communication system according to claim 2, wherein the data connection unit is configured to receive a second structured electronic message having an information part with inferenced information from the second interpretation system.

4. The communication system according to claim 1, wherein the interpretation system is configured to convert the structured electronic message into an information part of another structured electronic message.

5. The communication system according to claim 1, wherein the knowledge-base is configured to access multiple knowledge resources using a data connection.

6. The communication system according claim 1, wherein the interpretation system is configured to add a network address of the knowledge-base to the address part of the structured electronic message.

7. The communication system according to claim 1, wherein the interpretation system is adapted to create a unique identifier for each one of additional structured electronic messages and modify the address part to include the unique identifier of the structured electronic message.

8. The communication system according to claim 7, wherein the interpretation system is adapted to link the additional structured electronic messages to each other by adding the unique identifier into the information part.

9. The communication system according to claim 1, wherein the interpretation system is configured to modify the structured electronic message such that the information part contains one or more additional structured electronic messages.

10. The communication system according to claim 1, wherein the data connection unit is configured to receive information from the second communication device and transfer the information to the knowledge-base.

11. The communication system according to claim 1, wherein the first communication device is adapted to display the structured electronic message in a visually accessible manner.

12. The communication system according to claim 11, wherein the first communication device is configured to provide a list of predefined messages for being selected as the structured electronic message.

13. The communication system according to claim 1, further comprising:
- an inference engine in communication with the interpretation system, wherein the inference engine is configured to communicate with a second interpretation system for interpreting the structured electronic message, communicate interpreted structured electronic message to the interpretation system, and sending the structured electronic message to the receiver via the sender unit of the interpretation system.

* * * * *